Oct. 24, 1950

L. J. BASSO 2,526,626

DADO GAUGE

Filed Oct. 11, 1945

INVENTOR.
Louis J. Basso
BY
Ralph L Chappel
ATTORNEY

Patented Oct. 24, 1950

2,526,626

UNITED STATES PATENT OFFICE 2,526,626

DADO GAUGE

Louis J. Basso, New York, N. Y.

Application October 11, 1945, Serial No. 621,663

3 Claims. (Cl. 143—168)

(Granted under the act of March 3, 1883, as amended April 30, 1928; 370 O. G. 757)

The present invention relates to a gauge and has special reference to a gauge for controlling the feed of material while grooves or dadoes are formed therein.

More particularly, this invention relates to a gauge for accurately controlling the feed of material beneath a circular saw employed for cutting dadoes in the material so that the dadoes will be uniformly spaced.

In manufacturing cabinets, bins, racks, and the like, having shelves, dadoes or grooves are formed into which the shelves fit for support. It is essential that all the dadoes be exactly located so that the shelves will be properly spaced and aligned.

The pieces to be dadoed are intermittently fed longitudinally beneath a circular saw which is moved transversely thereof to cut the slots. The present gauge is employed to insure that the pieces are moved the proper distance between successive cuts.

An object of this invention is to provide a gauge for accurately controlling the feed of material to a machine cutting dadoes therein so that the dadoes will be evenly spaced.

Another object is to provide such a gauge of simple construction which can be easily and quickly attached to a saw table and adjusted for use.

Figure 1:
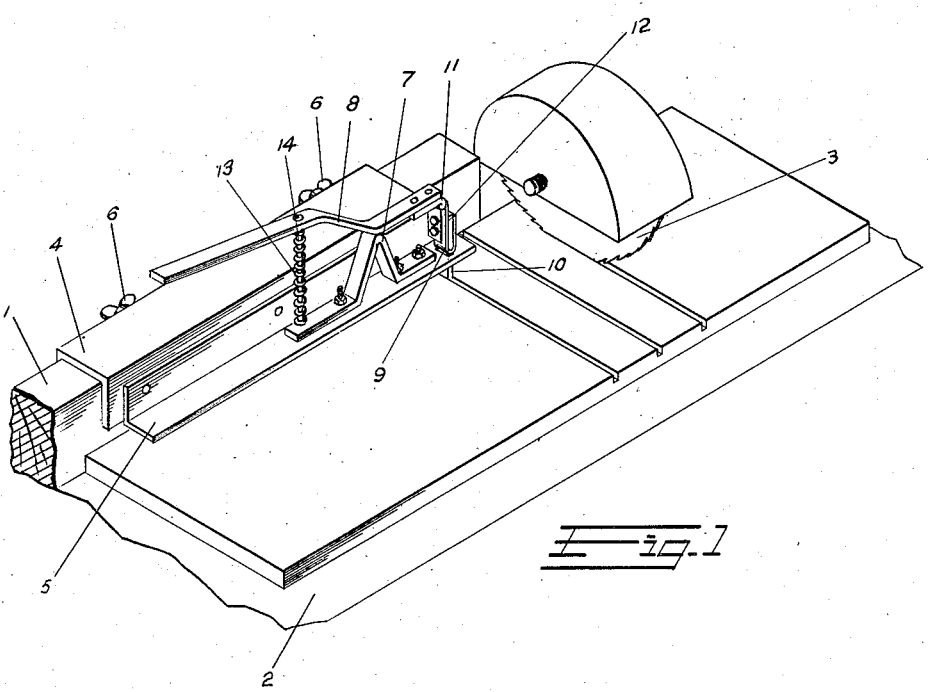
Figure 2:
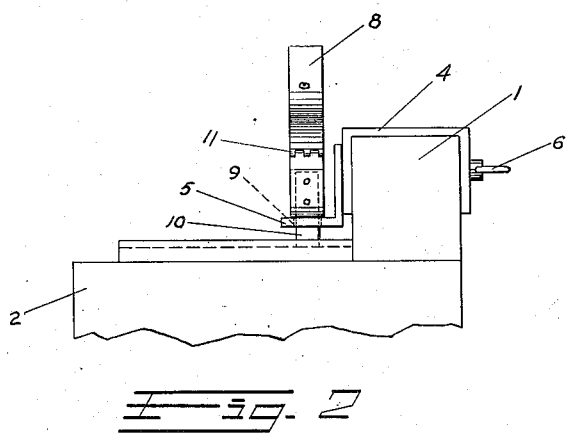

Further objects and advantages of this invention, as well as its construction, arrangement and operation, will be apparent from the following description and claims in connection with the accompanying drawings, in which:

Fig. 1 is an isometric view of a gauge embodying the present invention employed in connection with a sheet of material passing beneath a circular saw, and Fig. 2 is an end elevational view of the device shown in Fig. 1 with the saw removed.

In the drawing there is shown a gauge embodying the present invention mounted on the side guide 1 of a saw table 2. A circular saw 3 mounted on a movable carriage (not shown) reciprocates transversely of the saw table 2 and cuts dadoes in sheets of material moving longitudinally of the table. The gauge comprises a channel shaped portion 4 for fitting over the saw table guide and a horizontal base 5. Set screws 6 are threaded into the channel portion for rigidly clamping the gauge to the saw table guide.

Mounted on the base 5 is an elevated pivot support 7. A lever 8 is pivotally mounted on the pivot support 7 intermediate the ends of the lever. A transverse slot 9 is formed in the base 5 adjacent one end thereof and one end of the lever 8 terminates substantially over the slot 9. Positioned to register with the slot 9 is a tongue 10 which normally projects through the slot. The upper end of the tongue 10 is pivotally connected to the end of the lever 8. For this purpose a hinge 11 may be employed with one wing thereof secured to the end of the lever 8 and the other wing to the upper portion of the tongue 10. With this construction movement of the lever will cause vertical movement of the tongue. In order to limit the downward movement of the tongue 10 a channel clip 12 which is wider than the width of the slot 9 is mounted on the upper portion of the tongue with the tongue extending through a slot in the bottom of the clip.

A compression spring 13 is mounted between the base 5 and the free end of the lever 8 and is kept in place by a spring guide 14. The spring 13 normally maintains the free end of lever 8 in a raised position thus depressing the opposite end and the tongue 10 the maximum distance.

In operation, the material to be cut is fed manually beneath the circular saw and the first two grooves or dadoes are cut therein. The gauge is then mounted with the tongue engaging the first groove or dado and the material in position for the third dado to be cut therein. Thereafter, as each dado is cut, the free end of the lever 8 is depressed raising the tongue from the dado and the material then moved forward until the tongue engages the next dado.

Once the gauge has been set any number of dadoes may be successively cut, each adjacent pair of which will be the correct distance apart. As the tongue engages the dadoes the material will be properly positioned quickly and accurately.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A gauge for use in cutting dadoes comprising a frame having a channel portion and a slotted base portion extending from said channel portion, means for attaching said channel portion to a saw table above the work supporting surface of said table, a vertically movable tongue associated with said frame and adapted to project through the slot in said base portion, a lever pivotally mounted on said base portion and connected to said tongue, and resilient means normally maintaining said tongue projecting below said base portion.

2. The gauge as defined in claim 1 wherein the work is adapted to be relatively movably positionable between said base portion and the work-supporting surface of the table, and said tongue in its lowermost position being adapted to engage the work.

3. A gauge for use in cutting dadoes comprising a frame having a slot in a bottom portion thereof, means for attaching said frame to a saw table with said bottom portion disposed above the work-supporting surface of said table, a vertically movable work-engaging tongue mounted on said frame to register with said slot, a lever pivotally mounted intermediate the ends thereof on said bottom portion, one end of said lever being pivotally connected to said tongue for causing vertical movement of said tongue, and a spring between said frame and said lever for normally maintaining said tongue projecting below said frame.

LOUIS J. BASSO.

REFERENCES CITED

The following references are of record in the file of this patent:

UNITED STATES PATENTS

| Number | Name | Date |
| --- | --- | --- |
| 138,649 | Hammond | May 6, 1873 |
| 149,433 | Bryant | Apr. 7, 1874 |
| 1,092,518 | Brooks | Apr. 7, 1914 |
| 1,735,216 | Sims | Nov. 12, 1929 |
| 2,353,794 | Svikhart | July 18, 1944 |